(12) United States Patent
Moriwaki et al.

(10) Patent No.: US 6,610,445 B1
(45) Date of Patent: Aug. 26, 2003

(54) HYDROGEN STORAGE ALLOY ELECTRODE, BATTERY INCLUDING THE SAME AND METHOD FOR PRODUCING THE BOTH

(75) Inventors: Yoshio Moriwaki, Hirakata (JP); Sou Kuranaka, Fujisawa (JP); Mizuo Iwasaki, Katano (JP); Yasuhiko Yamasaki, Hirakata (JP); Akihiro Maeda, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/719,527
(22) PCT Filed: Apr. 10, 2000
(86) PCT No.: PCT/JP00/02343
§ 371 (c)(1),
(2), (4) Date: Jan. 31, 2001
(87) PCT Pub. No.: WO00/62359
PCT Pub. Date: Oct. 19, 2000

(30) Foreign Application Priority Data

Apr. 14, 1999 (JP) ............................................. 11-106592
Feb. 29, 2000 (JP) ........................................ 2000-052670

(51) Int. Cl.⁷ ................................................. H01M 4/58
(52) U.S. Cl. ..................... 429/218.2; 429/223; 420/900
(58) Field of Search ............................. 429/218.2, 223; 420/900

(56) References Cited

U.S. PATENT DOCUMENTS 5,695,530 A * 12/1997 Hong et al. ............... 429/218.2
5,905,004 A   5/1999 Sakai et al. .................. 429/232

FOREIGN PATENT DOCUMENTS

| EP | 0 867 248 A1 | 9/1998 |
| JP | 2-310388 | * 12/1990 |
| JP | 7-307154 | 11/1995 |
| JP | 9-92271 | 4/1997 |
| JP | 9-245797 | 9/1997 |
| JP | 10-149818 | * 6/1998 |

* cited by examiner

Primary Examiner—Laura Weiner
(74) Attorney, Agent, or Firm—Akin, Gump, Strauss, Hauer & Feld, L.L.P.

(57) ABSTRACT

In the description, a hydrogen storage alloy electrode comprising a hydrogen storage alloy and a conductive metal and completely free of organic binder is disclosed, wherein at least two layers of an active material holding layer and a conductive metal layer essentially are integrated into an electrode sheet having a conductive network communicating throughout the electrode. The electrode can be used in a nickel-metal hydride storage battery, for example, particularly exhibits high efficiency charge/discharge characteristics while satisfying general characteristics as a battery, and has a relatively low cost and facilitates recycling.

13 Claims, 11 Drawing Sheets

HYDROGEN STORAGE ALLOY ELECTRODE, BATTERY INCLUDING THE SAME AND METHOD FOR PRODUCING THE BOTH

BACKGROUND OF THE INVENTION

1. Technical Field

The present invention relates to a hydrogen storage alloy electrode which can electrochemically absorb therein (charge) and desorb therefrom (discharge) hydrogen and is applicable to storage batteries such as nickel-metal hydride storage battery.

2. Background Art

Recently, nickel-metal hydride batteries including a hydrogen storage alloy electrode as the negative electrode have rapidly become popular in our daily life because of their use as the secondary battery of compact portable appliances such as personal computer and cellular phone. The nickel-metal hydride battery is characterized in that it has a 1.5- to 2-fold higher capacity and is more pollution-free than the conventionally and widely used nickel-cadmium storage battery because of no use of poisonous cadmium. More recently, in addition to compact portable appliances, application and inclusion of the nickel-metal hydride storage battery has been widened even to electric vehicle (EV) and hybrid electric vehicle (HEV) and further to electric instruments and emergency lights to which the nickel-cadmium storage battery has conventionally been applied widely.

A conventional type of hydrogen storage alloy electrode used in the nickel-metal hydride storage battery has been produced mainly by a paste coating technique. Such paste electrode is obtained by a method which mixes a hydrogen storage alloy powder, organic binders such as styrene-butadiene rubber (SBR) and/or carboxymethyl cellulose (CMC) and a conductive powder such as carbon, kneads the resultant mixture into a paste, then coats the paste on both surfaces of a low cost conductive core member made of punched metal such as nickel-plated iron sheet and subsequently dries, presses and cuts the conductive core member to make an electrode (see the publication of the U.S. Pat. No. 5,527,638, for example).

The paste electrode produced by the paste coating technique is relatively specific to mass production and there are many attempts to realize the mass production. However, the paste electrode still has drawbacks of unsatisfactory high rate charge/discharge performance and unfitness for use in making instantaneous charge and discharge at a large current.

Another type of electrode is an electrode obtained by a method called sintering. The Japanese-Laid Open Patent Publication No. Hei 3-294405, for example, discloses a method for continuous manufacturing of negative electrodes which supplies a hydrogen storage alloy fine powder to a wire mesh screen, then compresses the screen to form a deposit and sinters the deposit, followed by quenching the sintered deposit in a gaseous hydrogen atmosphere. In this method, although improved high rate charge/discharge performance can be expected as compared with the paste type electrode, it also has drawbacks of much laborious process and liable reduction of alloy performance due to sintering, which have disturbed wide use of sintered electrode.

Apart from the paste coating and sintering methods, a method has been proposed in, for example, Japanese Laid-Open Patent Publication No. Sho 62-216163 which obtains an electrode by molding a mixture of a hydrogen storage alloy with a fluorocarbon resin binder into a sheet and then mechanically pressing the sheet against a current collector. However, the electrode obtained by this method has a problem that it catches fire easily, in addition to the conventional problem of unsatisfactory high rate charge/discharge performance.

The electrode obtained by any of the above-mentioned methods described in the publication of the U.S. Pat. No. 5,527,638 and Japanese Laid-Open Patent Publication No. Sho 62-216163 includes some form of organic binder which is used as an essential constituent in the process of electrode production. The organic binder can be a factor for increasing electrode resistance.

To the contrary, as the method which does not use the organic binder as the factor for increasing electrode resistance, a method of producing electrode by a dry press technique using a scaly copper or nickel powder has been suggested in two Japanese Laid-Open Patent Publications No. Hei 7-307154 and Hei 9-245797, for example. However, the electrode obtained by this method is also disadvantageous in that due to insufficient contact between the hydrogen storage alloy portion and conductive metal portion, an absolute content of the conductive material must be increased in order to improve high rate charge/discharge performance. This type of electrode is considered to have another problem in terms of capacity density per electrode volume.

Despite many other proposed hydrogen storage alloy electrodes and methods for producing the same, there has been an increasing demand for a simple and low cost method which can readily offer an electrode with particularly excellent output characteristics.

Generally required conditions for the hydrogen storage alloy electrode for use in the nickel-metal hydride battery and so on from the aspect of the intended use include: (i) excellent high rate charge/discharge performance; (ii) high durability and long service life; (iii) high energy density; (iv) high conductivity; (v) high mechanical strength and ruggedness; (vi) simple, low cost and easy production method of high utility; and (vii) easy-to-recycle.

It is true that hydrogen storage alloy electrodes obtained by the previously described prior art methods may satisfy the above conditions considerably; however, there still exists a demand to further improve the conditions (i), (vi) and (vii) in response to recent market requests in particular.

Therefore, the primary object of the present invention is to provide a novel hydrogen storage alloy electrode which has excellent high rate charge/discharge characteristics and facilitates recycling by using a low cost method of high utility.

SUMMARY OF THE INVENTION

The present invention is characterized by a hydrogen storage alloy electrode comprising a hydrogen storage alloy and a conductive metal and completely free of organic binder, which is formed by integrating at least two layers of an active material holding layer essentially composed of a hydrogen storage alloy powder and a conductive metal powder and a conductive metal layer essentially composed of the conductive metal into a sheet and is imparted with a conductive network communicating throughout the electrode.

In the context of the present invention, the intended meaning of the "comprising" or "essentially composed of"

is that other components may also be contained to an extent not to injure the effect of the present invention.

In a preferred mode of the present invention, the conductive metal comprises Ni or Cu or an alloy containing Ni and Cu, and the active material holding layer essentially composed of the hydrogen storage alloy powder and conductive metal powder comprises 70 to 95 wt % hydrogen storage alloy powders and 30 to 5 wt % conductive metal powders and the conductive metal layer comprises 95 wt % or more conductive metal.

In another preferred mode of the present invention, a center of the electrode is essentially composed of the conductive metal layer and both ends of the electrode are essentially composed of the active material holding layer in a direction of electrode thickness.

Inversely, the center may be essentially composed of the active material holding layer and both ends may be essentially composed of a porous conductive metal layer in a direction of electrode thickness.

In another preferred mode of the present invention, compositions of the conductive metal layer and the active material holding layer are inclined in continuity in a direction of electrode thickness.

Further, both ends of the electrode are preferably plated and have conductive metal layers.

In a further preferred mode of the present invention, at leaset one portion of the conductive metal layer is composed of a two-dimensional or three-dimensional porous metal. The two-dimensional or three-dimensional porous metal is desirably an embossed plate, punched metal sheet, expanded metal sheet, foamed metal sheet, lath metal sheet or metal fiber cloth.

Alternatively, it is also preferable that at leaset one portion of the conductive metal layer is composed of a metal foil.

One end or both ends of the electrode may be composed only of the conductive metal layer in a direction of electrode width.

In still another preferred mode of the present invention, the electrode has a thickness of 0.5 mm or less and a porosity of 5 to 20%.

It is also preferable that the hydrogen storage alloy powder has a nickel-rich surface by pretreated with hot alkali or acid.

It is also desirable that the hydrogen storage alloy powder is subjected to mechanofusion or plating beforehand and has a surface having a metallic nickel layer.

The present invention also relates to a method for producing hydrogen storage alloy electrode comprising a hydrogen storage alloy and a conductive metal and completely free of organic binder, comprising the steps of:
(a) supplying a hydrogen storage alloy powder, a conductive metal powder and/or a porous conductive metal;
(b) laminating at least two layers of an active material holding layer comprising a mixture of the hydrogen storage alloy powder and/or conductive metal powder and a conductive metal layer essentially composed of the conductive metal powder or porous conductive metal; and
(c) pressing a laminate produced by the previous step (b) to integrate the active material holding layer and conductive metal layer into a sheet and to produce a conductive network communicating throughout the electrode.

In the above-mentioned production method, step (b) and step (c) are preferably performed concurrently.

It is particularly desirable that the step (b) and step (c) are performed concurrently with a roll-press method using a pair of rolls whose surfaces have uneven parts.

It is also preferable that the mixture is heated in a non-oxidative atmosphere for 10 minutes or less in a temperature range of not less than 500 C and not more than the lowest melting point of the melting points of the metal elements constituting the electrode during or after step (c).

In that case, a desirable heating method is induction heating, electrical resistance heating, hot-press heating, or light beam heating or heat ray irradiation heating.

The present invention also provides a battery including a hydrogen storage alloy electrode comprising a hydrogen storage alloy and a conductive metal and completely free of organic binder, characterized in that the hydrogen strange alloy electrode is formed by integrating at least two layers of an active material holding layer essentially composed of a hydrogen storage alloy powder and a conductive metal powder and a conductive metal layer essentially composed of a conductive metal into a sheet and has a conductive network communicating throughout the electrode.

DETAILED DESCRIPTION OF THE INVENTION

Figure 1:
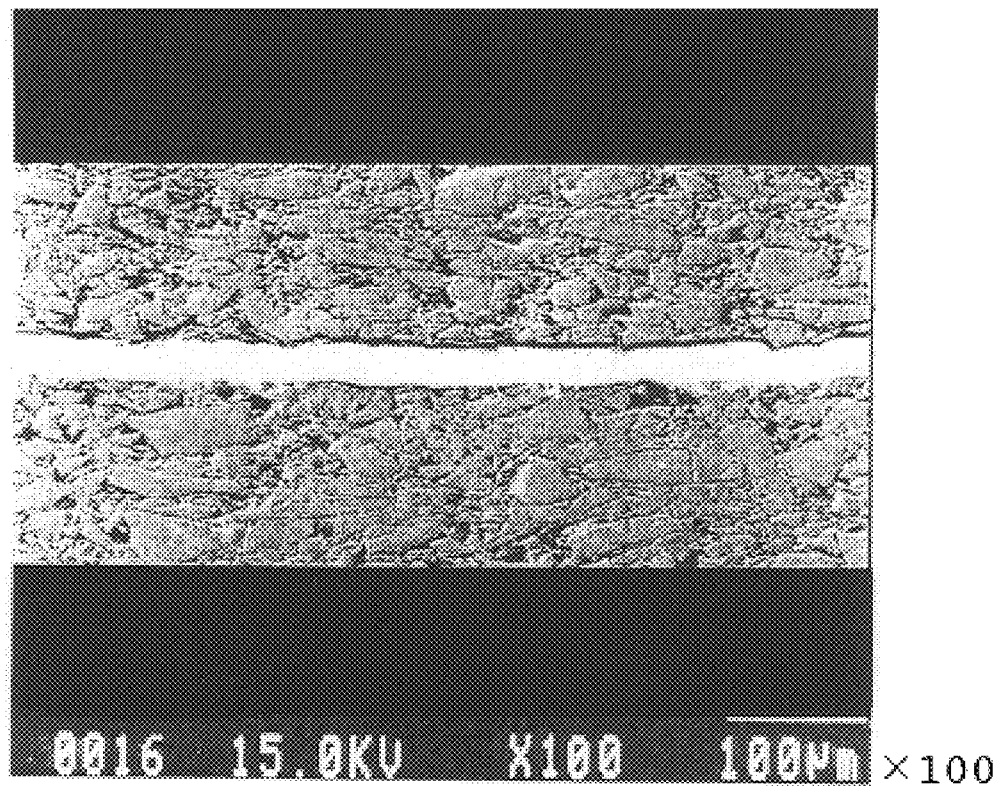
FIG. 1 is a scanning electron micrograph illustrating a cross-section of the layer structure of the hydrogen storage alloy electrode produced in accordance with one example of the present invention (×100).

In the following, the present invention will be described referring to concrete examples.

As described previously, the present invention relates to a hydrogen storage alloy electrode comprising a hydrogen storage alloy and a conductive metal and completely free of organic binder, characterized in that the electrode is formed by integrating at least two layers of an active material holding layer essentially composed of a hydrogen storage alloy powder and a conductive metal powder and a conductive metal layer essentially composed of a conductive metal into a sheet and is imparted with a conductive network communicating throughout the electrode and further to a method for producing the electrode. The present invention also relates to a battery obtained by using the hydrogen storage alloy electrode and the method for producing the same.

More specifically, the electrode in accordance with the present invention is a hydrogen storage alloy electrode obtained by pressure-rolling at least two layers of an active material holding layer and a conductive metal layer to integrate the resultant laminate into a sheet without use of the conventionally and widely used organic binder.

As stated before, there have been several attempts to remove the organic binder used as a binding material in order to reduce resistance components with electrode reaction or activity, However, prior methods have failed to achieve satisfactory contact between the hydrogen storage alloy and conductive material. The present invention improves the above-mentioned critical drawback of the conventional hydrogen storage alloy electrode and proposes an optimal electrode structure and a method for producing such hydrogen storage alloy electrode.

The conductive metal powder used in the present invention is preferably Ni or Cu or an alloy containing Ni and Cu. This is because both of Ni and Cu have excellent electron conductivity, chemical stability and ductility.

It is also desirable that the active material holding layer essentially composed of the hydrogen storage alloy powder and conductive metal powder comprises 70 to 95 wt % hydrogen storage alloy and 30 to 5 wt % conductive metal.

It is also desirable that the conductive metal layer comprises conductive metal by 95 wt % or more of the resultant electrode. This is to improve the high rate charge/discharge performance of the resultant electrode. As explained later, the conductive metal layer may be composed of a conductive metal powder or of a porous conductive metal. The conductive metal layer may further comprise the above-mentioned hydrogen storage alloy in addition to the conductive metal.

It is desirable for the electrode that the center is essentially composed of the conductive metal layer and both ends are essentially composed of the active material holding layer in the direction of electrode thickness.

Inversely, the center may be essentially composed of the active material holding layer and both ends essentially of the conductive metal layer. In this case, however, the conductive metal layer is desired to be porous in order not to inhibit the activity of the active material holding layer in the center. The latter structure has effects of improving very large current discharge performance and elongating service life of the battery under severe use conditions.

In obtaining high output characteristics, the conductive metal layer acts as a key constituent to securing an electron-conductive network throughout the electrode and an essential constituent for securing electrode flexibility.

From the aspect of further improving high rate charge/discharge performance of the electrode, at least one portion of the conductive metal layer may be composed of a two-dimensional or three-dimensional porous metal. As the two-dimensional or three-dimensional porous metal, an embossed plate, punched metal sheet, expanded metal sheet, metal sponge sheet or metal fiber cloth is desirable.

In this case, although Ni or Cu or an alloy containing Ni or Cu is a desirable material for constituting the two-dimensional or three-dimensional porous metal, an Ni- or Cu-plated iron steel plate which has low cost can also be used.

It is also preferable to incline the compositions of the conductive metal layer and active material holding layer in continuity in the direction of electrode thickness. Inclining the compositions not only improves high rate charge/discharge performance but also has an effect on the cycle life characteristics and mechanical strength.

Particularly, continuous gradient of the compositions of the hydrogen storage alloy powder and conductive metal powder is technically advantageous in that required characteristics for practical battery, such as high rate discharge characteristic and cycle life characteristic can be well-balanced.

Further in the present invention, the hydrogen storage alloy powder is preferably pretreated with hot alkali, acid, mechanofusion or plating to have a nickel-rich surface from the viewpoint that a conductive network communicating through the electrode to be obtained can be surely formed. The electrode in accordance with the present invention yields a high discharge rate and has satisfactory discharge performance. However, in order to let the electrode exhibit its excellent performance as a battery, it is desirable to form a current collector in the electrode. In doing so, it is particularly effective to provide one end or both ends of the electrode with the conductive metal by plating in a direction of electrode width. Examples of the plated metal are Cu, Ni and the like.

Direct electrical contact of the current collector with the conductive metal at one or both ends enables to decrease internal resistance of the electrode and improve high rate charge/discharge when it is assembled and operated as a battery. In addition, such conductive metal layer on the surface of the electrode facilitates reduction of gaseous oxygen, which is generated around the end of charge, and enables acute and rapid charge.

From the aspect of enabling rapid charge and discharge, it is preferable for the electrode to have a thickness of 0.5 mm or less which is rather thinner than usual. This range of thickness is desirable because the electrode in accordance with the present invention can exert its characteristics with ease.

Furthermore, in order to secure high capacity density, stabilize cycle life characteristics and enhance mechanical strength of the electrode, it is preferable to impart a relatively low porosity to the electrode by filling the constituents at a relatively high density to make an overall porosity in a range of 5 to 20%. This is because when the porosity is less than 5%, there is a tendency that the probability of exposure of an electrolyte with the electrode decreases and high rate discharge characteristic is impaired. To the contrary, when the porosity is more than 20%, there is a tendency that cycle life characteristics are impaired despite no particular problem in high rate discharge characteristic.

Next, the present invention also relates to a method for producing the above-mentioned hydrogen storage alloy electrode.

In other words, the present invention relates to a method for producing a hydrogen storage alloy electrode essentially comprising a hydrogen storage alloy and a conductive metal and completely free of organic binder, comprising the steps of:

(a) supplying a hydrogen storage alloy powder, a conductive metal powder and/or a porous conductive metal;

(b) laminating at least two layers of an active material holding layer comprising a mixture of the hydrogen storage alloy powder and/or the conductive metal powder and a conductive metal layer essentially composed of the conductive metal powder or the porous conductive metal; and (c) pressing a laminate produced by the previous step (b) to integrate the active material holding layer and the conductive metal layer to make an electrode sheet and to impart to the electrode with a conductive network communicating throughout the electrode.

The mixture of the hydrogen storage alloy powder and conductive metal powder is molded into a high density sheet by pressure molding.

Exemplary applicable pressure molding methods include press-molding using a flat press machine, roll pressing using a pair of rolls and calendaring.

In the production method in accordance with the present invention, it is preferable to perform step (b) step (c) concurrently from the aspect of efficient manufacturing process.

In doing so, if roll pressing using a pair of rolls is selected, it is preferable to control supply of the hydrogen storage alloy powder and conductive metal powder as explained later referring to FIG. 2.

If an uneven part is formed on the surfaces of the pair of rolls, it is possible to obtain a hydrogen storage alloy electrode having a surface shaped in correspondence with the shape of the uneven part.

Figure 10:
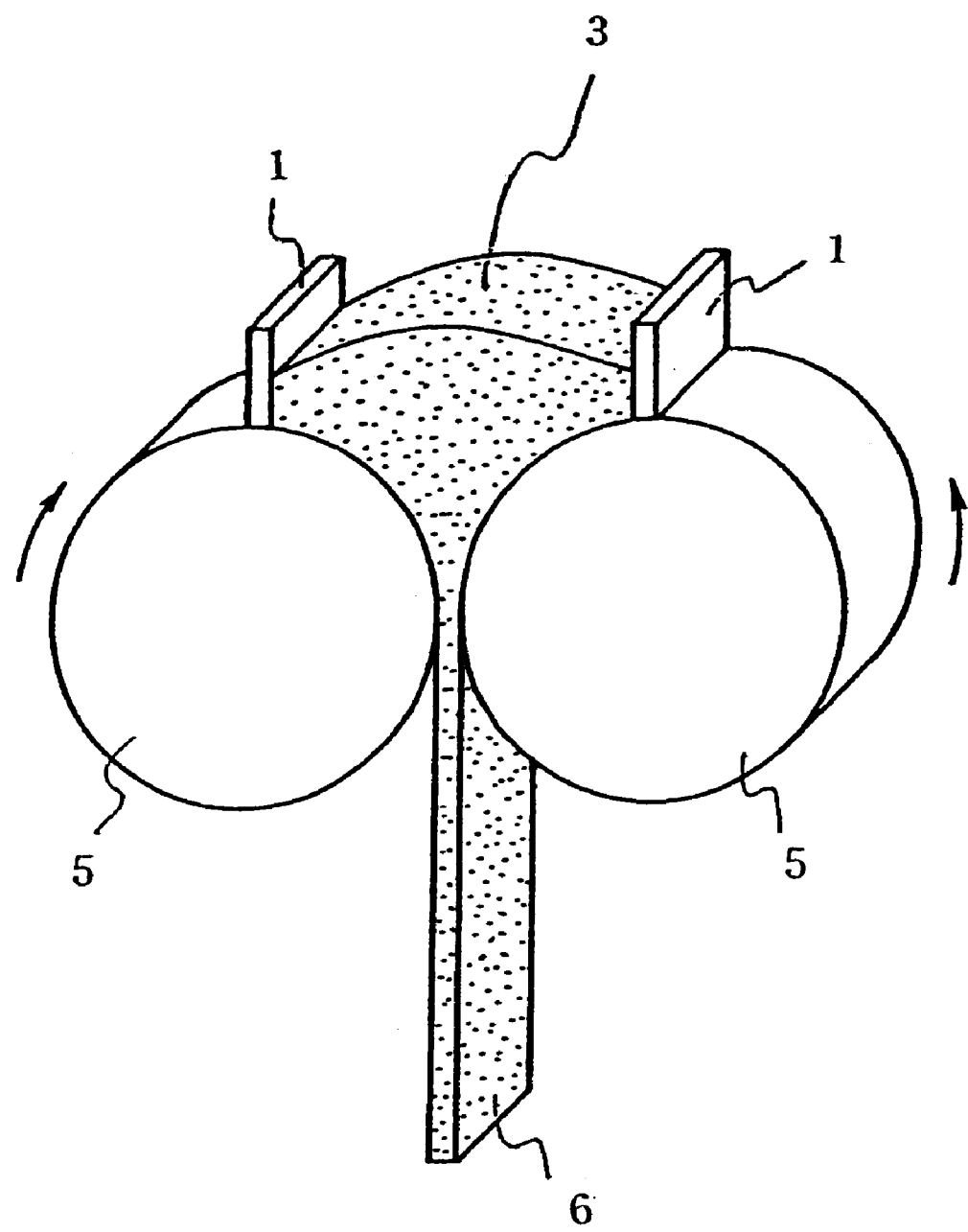
FIG. 10 is a schematic view of a press-molding apparatus using a conventional roll.

FIG. 10 is a schematic view for illustrating a conventional rolling method using a pair of rolls.

The conventional roll rolling method supplies a mixture 3 of a hydrogen storage alloy powder and a conductive metal powder between a pair of rolls 5 by regulating supply of the mixture with a partitioning plate 1 and molds the mixture into a sheet thereby to obtain a hydrogen storage alloy electrode 6.

By contrast, the method for producing hydrogen storage alloy electrode in accordance with the present invention supplies, to a pressure or compression molding machine, the mixture of the hydrogen storage alloy powder and the conductive metal powder to be pressure molded in correspondence with the intended structure of the active material holding layer and conductive metal layer.

Here, the production method of the present invention will be described by referring to the rolling method using a pair of rolls as representative, with reference to FIG. 2. In this example, an electrode is produced wherein the center comprises the conductive metal layer composed of a conductive metal powder 4 and both ends comprise the active material holding layer composed of the hydrogen storage alloy powder and the conductive metal powder in a direction of electrode thickness.

Figure 2:
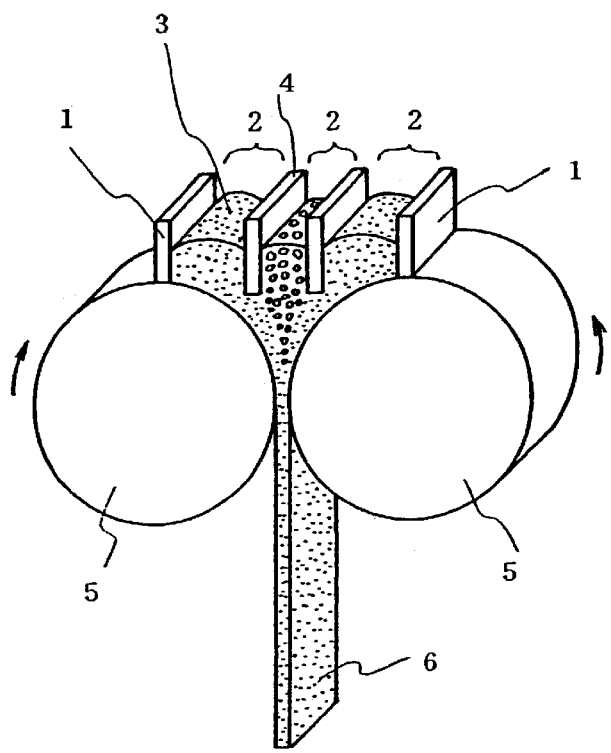
FIG. 2 is a schematic view of an apparatus used for producing the hydrogen storage alloy electrode in accordance with one example of the present invention.
Figure 3:
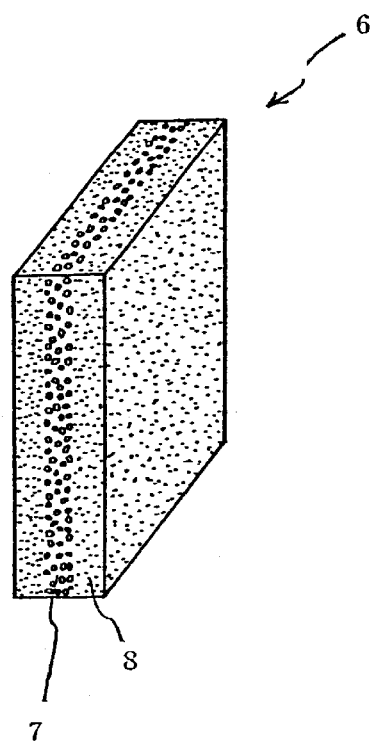
FIG. 3 is a schematic perspective view illustrating a hydrogen storage alloy electrode produced by the apparatus shown in FIG. 2 and used in one example of the present invention.

As shown in FIG. 2, two or more partitioning plates 1 are provided in accordance with the layer structure of the resultant electrode, and a mixture 3 of the hydrogen storage alloy powder and conductive metal powder or the conductive metal powder 4 is introduced into a supplying unit 2 between the partitioning plates 1 to supply it between the rolls 5. This gives a hydrogen storage alloy electrode 6 comprising a conductive metal layer 7 and an active material holding layer 8 as shown in FIG. 3. FIG. 3 is a schematic view illustrating a hydrogen storage alloy electrode in accordance with one example of the present invention. The partitioning plate 1 may be shaped in the so-called hopper.

Then, the shape of rolls applicable to the method for producing hydrogen storage alloy electrode in accordance with the present invention will be described.

In the present invention, a roll having a smooth surface as illustrated in FIG. 2 may be used; however, the use of a variety of rolls having surfaces with different uneven parts is effective. This is because a variety of hydrogen storage alloy electrodes having surfaces with different shapes in accordance with the shapes of the uneven parts can be obtained. Such uneven shape may be exemplified as crepe weave and caterpillar. Shapes as applied in usual embossing and gravure finish may also be used.

The rolls having such shape can prevent the powders to be pressurized or compressed from slipping on the surface of the rolls and performs excellent compression effect. Also, surface area of the electrode to be obtained can increase and improve reduction ability of gaseous oxygen, which is generated around the end of charge.

More specifically, the roll may have both or one of concave part and convex part. In the use of a pair of rolls, the convex part may be formed on the surface of one roll and the concave part on the surface of the other roll. As such, the use of different combinations can offer a variety of hydrogen storage alloy electrode having different surface shapes.

As mentioned before, formation of uneven parts on the surface of the hydrogen storage alloy electrode has an effect of facilitating bending of the resultant hydrogen storage alloy sheet and penetration of the electrolyte into the hydrogen storage alloy electrode.

Figure 4:
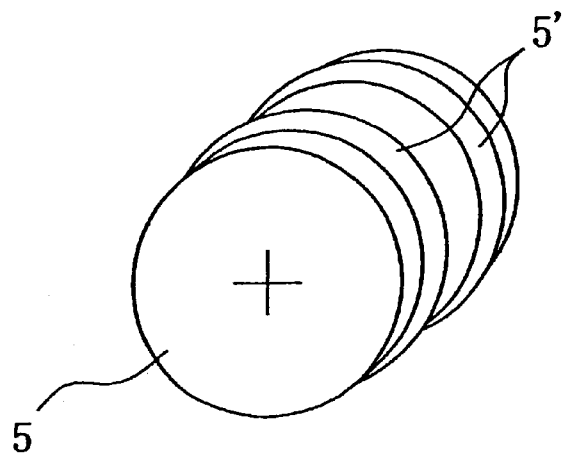
FIG. 4 is a schematic perspective view illustrating the surface shape of rolls used in the present invention.
Figure 5:
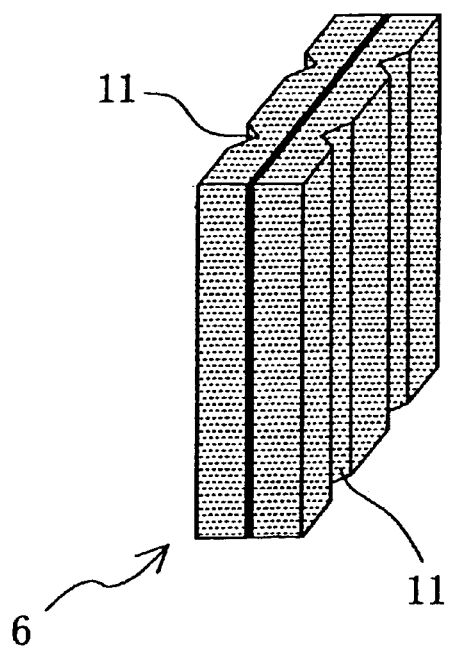
FIG. 5 is a schematic perspective view illustrating a hydrogen storage alloy electrode produced by the roll shown in FIG. 4.
Figure 6:
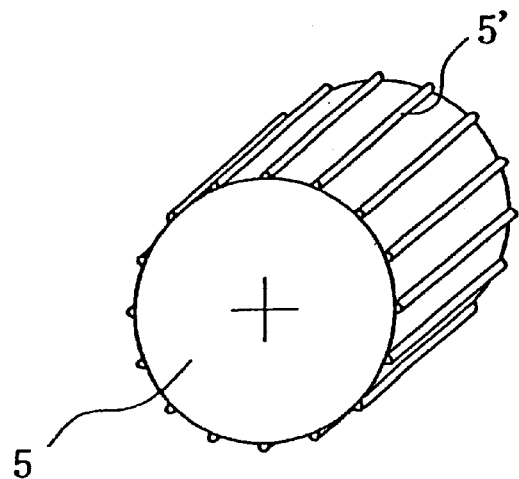
FIG. 6 is a schematic perspective view illustrating the surface shape of rolls used in the present invention.
Figure 7:
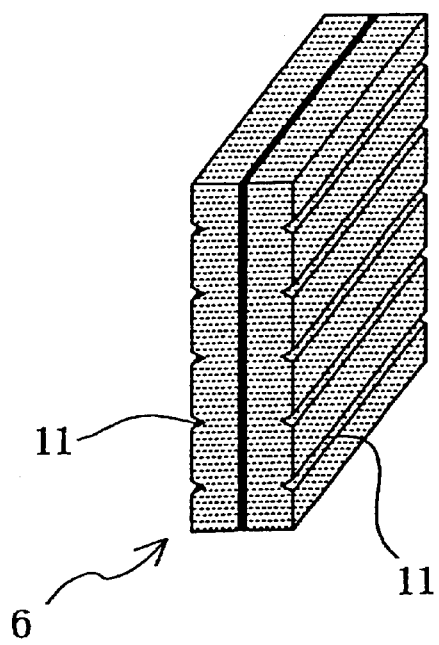
FIG. 7 is a schematic perspective view illustrating a hydrogen storage alloy electrode produced by the roll shown in FIG. 6.
Figure 8:
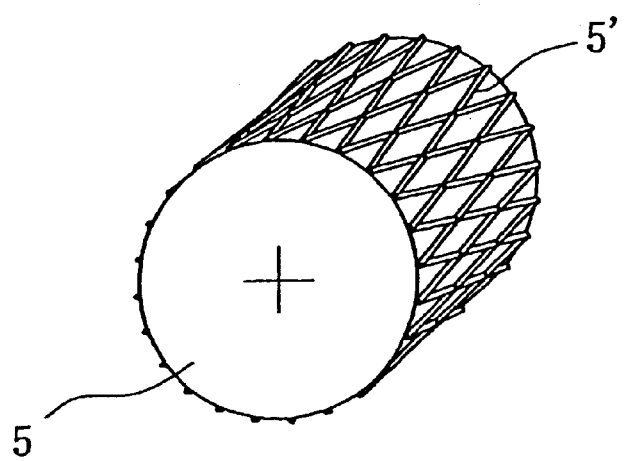
FIG. 8 is a schematic perspective view illustrating the surface shape of rolls used in the present invention.
Figure 9:
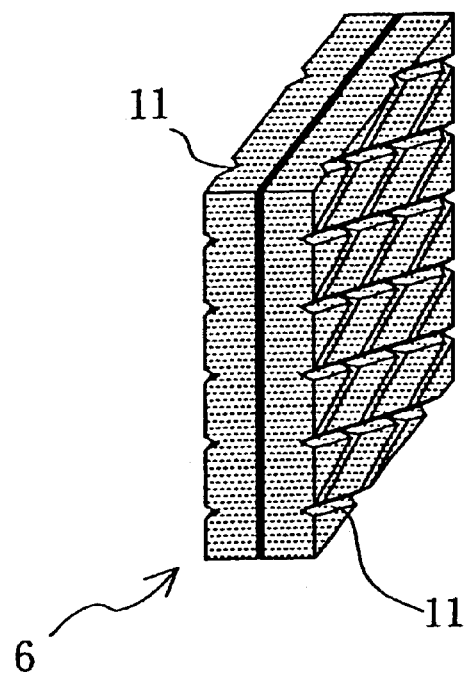
FIG. 9 is a schematic perspective view illustrating a hydrogen storage alloy electrode produced by the roll shown in FIG. 8.

FIG. 4 to FIG. 9 show the shapes of uneven parts on the surfaces of rolls and the shapes of the hydrogen storage alloy electrodes produced by using those rolls. FIG. 4, FIG. 6 and FIG. 8 show schematic views of the rolls applicable to the present invention and FIG. 5, FIG. 7 and FIG. 9 show schematic views of the hydrogen storage alloy electrodes produced by using the respective rolls shown in FIG. 4, FIG. 6 and FIG. 8.

A roll 5 shown in FIG. 4 is provided on its surface with two parallel convex parts 5' in a rolling direction. The hydrogen storage alloy electrode 6 obtained by the roll 5 has on its both surfaces two concave parts 11 in correspondence with the convex parts 5' of the roll 5 as shown in FIG. 5.

The roll 5 shown in FIG. 6 is provided on its surface with parallel convex parts 5' in a rolling direction. The roll 5 can give a hydrogen storage alloy electrode having concave parts 11 as shown in FIG. 7.

The roll 5 shown in FIG. 8 is provided on its surface with convex grids 5' and can give another hydrogen storage alloy electrode 6 whose surface has concave grids 11.

In each of FIGS. 5, 7 and 9, porous embossed core member made of Ni is employed as the conductive metal layer.

Similarly, the use of a flat press machine can also offer the hydrogen storage alloy electrode of the present invention having the above-mentioned structure by modifying the supplying method of the hydrogen storage alloy powder and conductive metal powder as appropriate.

In a preferred mode of the method for producing hydrogen storage alloy electrode in accordance with the present invention, the mixture of the hydrogen storage alloy powder and conductive metal powder is heated in a non-oxidative atmosphere for 10 minutes or less in a temperature range of not less than 500° C. and not more than the lowest melting point of the melting points of the metal elements constituting the alloy and conductive metal during or after the pressure molding step (c) to make a sheet.

Such short-term heat treatment allows only the surface layer of the hydrogen storage alloy to react with the conductive metal layer to be baked excluding reaction and baking of the interior of the hydrogen storage alloy thereby imparting with a gradient function to the resultant electrode. As a result, an electrode can be obtained wherein the hydrogen storage alloy and the conductive metal are firmly fixed or adhered to each other. It is also possible to further improve the high rate discharge characteristic, cycle life and mechanical strength of the electrode.

It is desirable to perform the short-term heat treatment in a non-oxidative atmosphere such as inert gas atmosphere like argon gas or vacuum in order not to damage inherent functions of the hydrogen storage alloy and conductive metal due to their reaction in some form.

It is of particular importance to best prevent the hydrogen storage alloy from being oxidized by oxygen gas due to high temperature.

Desirable heating temperature used in the short-term heat treatment is not lower than 500° C. and not more than the lowest melting point of the melting points of the metal elements constituting the electrode. At a temperature over the lowest melting point, baking of the metals having a melting temperature lower than that temperature proceeds in an accelerated manner, which may in turn reduce the hydrogen absorbing capacity of the hydrogen storage alloy excessively. Inversely, a temperature lower than 500° C. has no heating effect.

It is very important to shorten the duration of the short-term heat treatment as much as possible in order to facilitate control of baking, and a desirable duration is within 10 minutes, for example.

This time condition is very delicate; it has already been proven that when the hydrogen storage alloy is baked in a conventional electric oven, reaction and baking of the hydrogen storage alloy and conductive metal proceeds excessively and the hydrogen storage capacity of the hydrogen storage alloy is decreased excessively. Therefore, common sensed short heating time is desirably within 10 minutes, more desirably in seconds if possible.

It is preferable to perform the short-term heat treatment with induction heating, excitation heating, or hot-press heating or light beam heating or heat ray irradiation heating, for example.

In order to obtain an electrode with excellent performance, it is particularly preferred to perform short-term heat treatment while pressure molding a molding material. Treatment using a hot roll is effective. Of the above-mentioned heating methods, excitation heating is most effective. The reason is that since this method passes a current through the electrode constituents, heating can be done effectively along the distribution of current.

The use of induction heating is also effective because a ferromagnetic part of the hydrogen storage alloy having a nickel-rich layer is considered to be preferentially heated.

In the following, the present invention will be described more specifically referring to concrete examples. However, the present invention is not limited only to those examples.

EXAMPLE 1

As the hydrogen storage alloy powder, an alloy of $AB_5$ type represented by the formula $MmNi_{3.6}Mn_{0.4}Al_{0.3}Co_{0.7}$ was used. The powder was obtained by mechanically grinding into fine particles an ingot obtained by thermally treating an alloy of the above composition produced by using a known high frequency induction melting and casting method. The powder has a particle size of about 30 $\mu$m. Some of the alloy powders were treated with alkali by immersion in an aqueous 30 wt % KOH solution at 80° C. for one hour. It was confirmed that the surface layer of the hydrogen storage alloy powder treated with alkali was rich in metallic nickel as compared with the surface layer of the hydrogen storage alloy powder with no treatment with alkali.

Either hydrogen storage alloy powder was homogeneously mixed with an Ni powder as a conductive metal powder having a particle size of about 5 $\mu$m in a ratio of 10 wt % which gave a mixed powder. The mixed powder and the Ni powder were molded into an electrode sheet using the apparatus as shown in FIG. 2, wherein the center comprised a conductive metal layer composed of the Ni powder and both ends comprised an active material holding layer composed of the hydrogen storage alloy powder and Ni powder in a direction of electrode thickness. Then, the sheet was cut to obtain a hydrogen storage alloy electrode. Here, the electrode obtained by using non-treated hydrogen storage alloy powder was named "A1" and the electrode obtained by using alkali-treated hydrogen storage alloy powder was named "A2". In making electrodes A1 and A2, positioning of the partitioning plate 1 was controlled to make a thickness of about 60 $\mu$m for the center in a thickness direction, that is, the conductive metal layer. The electrode thickness was adjusted to about 300 $\mu$m.

Electrodes A1 and A2 are both hydrogen storage alloy electrodes formed by completely omitting organic binder wherein the active material holding layer essentially composed of the hydrogen storage alloy and the conductive metal and the conductive metal layer essentially composed of the conductive metal were integrated into an electrode sheet imparted with a conductive network communicating throughout the electrode.

Now, a scanning electron micrograph illustrating the cross-section of the layer structure of electrode A2 is shown in FIG. 1 (×100).

FIG. 1 is a 100 times magnified micrograph from which placement of the conductive metal layer in the center of the electrode can be clearly seen. It can also be visually confirmed sufficiently that the conductive metal layer and the active material holding layer are closely touching and binding to each other and a conductive network is formed throughout the electrode. The upper and lower of the electrode of a three layer structure in black indicates background.

COMPARATIVE EXAMPLE 1

A mixed powder was prepared by homogeneously mixing an identical alloy powder and an identical Ni powder to those of electrode A2 in Example 1 in a ratio of 10 wt %. Then, the mixed powder was formed into an electrode sheet comprising only the active material holding layer using the apparatus as shown in FIG. 10, which was named electrode "B".

Figure 11:
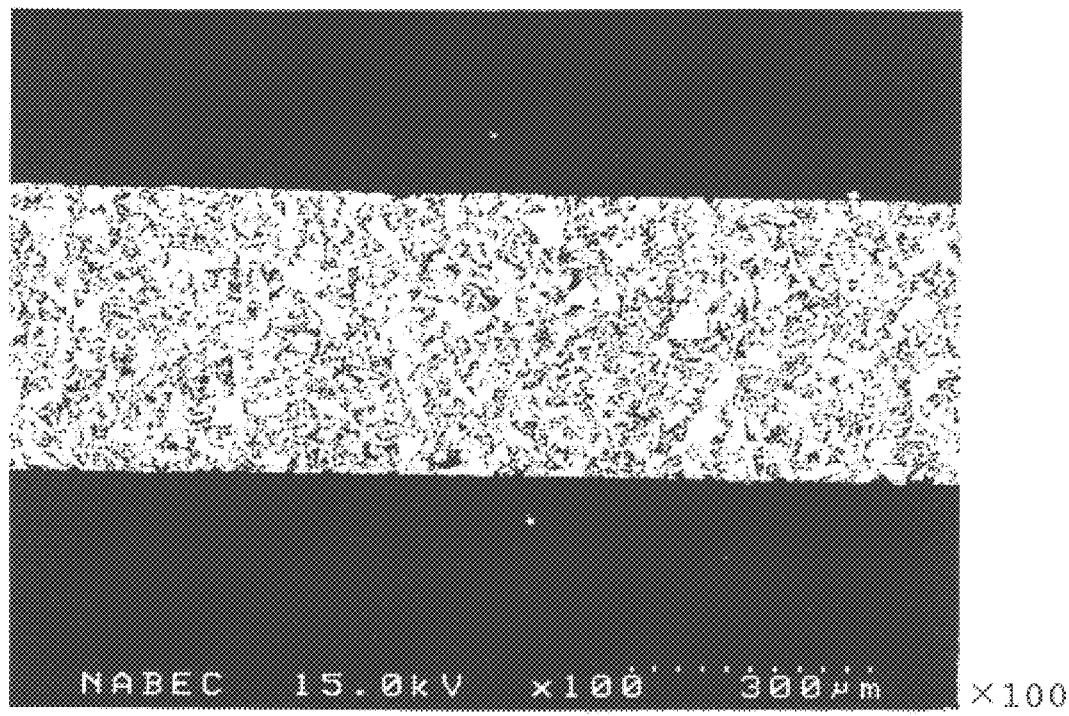
FIG. 11 is a scanning electron micrograph illustrating a cross-section of the layer structure of the hydrogen storage alloy electrode produced in accordance with a comparative example (×100).
Figure 12:
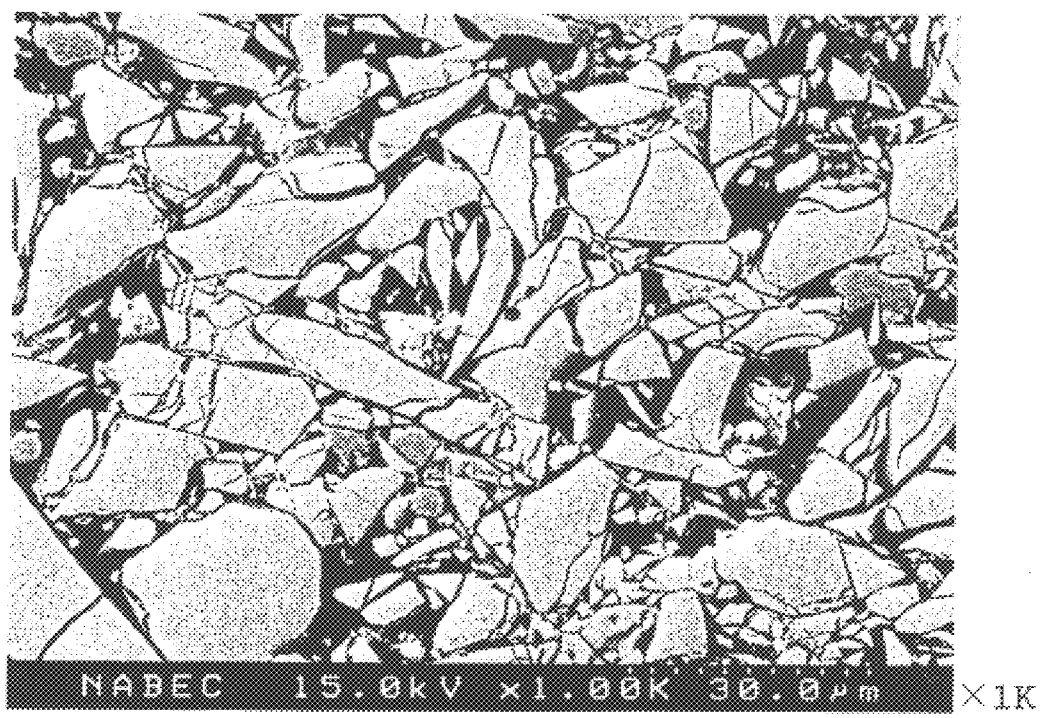
FIG. 12 is a scanning electron micrograph illustrating a cross-section of the layer structure of the hydrogen storage alloy electrode produced in accordance with another comparative example (×1000).

Electrode B as obtained had a thickness of about 300 μm. Another scanning electron micrograph illustrating the cross-section of the layer structure of electrode B is shown in FIG. 11 (×100). FIG. 12 is a 1000 times magnified micrograph. The upper and lower of the electrode in black indicates background.

In electrode B, the Ni powder is dispersed around the hydrogen storage alloy to form an active material holding layer. However, there is no conductive metal layer which is an essential constituent of the electrode in accordance with the present invention, rendering the electrode mechanically fragile and collapsible.

From FIG. 11, it can be seen that pressure molding using the roll can offer a molded sheet wherein all of the constituting powders are bound to each other with no use of binding material.

COMPARATIVE EXAMPLE 2

For comparison, a paste electrode "C" was produced by coating a mixed paste of a hydrogen storage alloy, a carbon powder as a conductive material and SBR and CMC as organic binder onto a conventionally known punched metal, followed by drying and pressing the metal.

[Evaluation]

Electrodes A1 and A2 of the present invention and electrodes B and C of comparative examples were evaluated for their electrode performance. Performance of those electrodes as a hydrogen storage alloy electrode was evaluated by assembling each of the electrodes into a half cell.

First, each of those electrode sheets were cut to a predetermined size to which an Ni ribbon lead was attached. As the counter electrode, a nickel positive electrode having an excess capacity as compared to that of the hydrogen storage alloy electrode was selected. Either hydrogen storage alloy electrode and the nickel positive electrode as the counter electrode were combined to form a sandwiched laminate by placing a polypropylene separator having hydrophilicity therebetween. Next, both ends of the laminate were sandwiched with plastic plates, which gave a pressurized electric power generating element. The electrolyte used here was an aqueous potassium hydroxide solution having a specific gravity of 1.30. Each of the electric power generating elements as produced in the above-mentioned manner underwent a charge/discharge test by regulating the capacity of the hydrogen storage alloy electrode.

At evaluation of electrodes A1, A2, B and C, the size or dimension was adjusted almost equal and the thickness was adjusted so that the amount of the hydrogen storage alloy per unit area becomes almost equal. At evaluation, the current rate was set on an assumption that the hydrogen storage alloy yielded a discharge capacity of 300 mAh/g. The set current rate was 1C for 300 mAh/g alloy.

First, at initial 5 charge/discharge cycles from 1st to 5th, a cycle of a charge for 12 hours with a current of 0.1 C at 25° C. and a discharge with a current of 0.2 C until the cell voltage drops to 0.8 V was repeated. The result showed that the discharge capacity at the 5th cycle was around 290 mAh/g in the electrodes A, B and C, with no significant differences in discharge capacity and discharge voltage at a low rate discharge as done in routine confirmation test of battery capacity.

Next, the electrodes were evaluated for their high rate discharge characteristic at the 6th and the subsequent cycles of the charge/discharge test. More specifically, after a charge with a current of 0.5 C at 25° C. for 2.5 hours, a discharge with a current of 1 C, 3 C and 5 C was performed in each cycle until the cell voltage dropped to 0.8 V. In order to evaluate high rate discharge characteristic at low temperature, a discharge with 1 C at 0° C. was also performed. The results are shown in Table 1. In Table 1, the discharge capacity at each discharge rate was expressed by capacity ratio (%) by defining the value of discharge at 25° C. with 0.2 C as 100%.

TABLE 1

Results of discharge capacity test at each temperature and at each discharge rate in electrodes A-C

|  | 25° C. 0.2 C | 25° C. 1.0 C | 25° C. 3.0 C | 25° C. 5.0 C | 0° C. 1.0 C |
|---|---|---|---|---|---|
| Electrode A1 | 294 mAh/g 100% | 91% | 69% | 42% | 81% |
| Electrode A2 | 292 mAh/g 100% | 93% | 72% | 50% | 84% |
| Electrode B | 289 mAh/g 100% | 85% | 53% | 21% | 74% |
| Electrode C | 290 mAh/g 100% | 90% | 63% | 34% | 78% |

As evident from Table 1, electrodes A1 and A2 in accordance with the present invention were found to exhibit much superior high rate discharge performance to the electrode B and conventional electrode C of comparative examples in terms of high rate discharge characteristic with 1 C, 3 C and 5 C and high rate discharge characteristic at low temperature of 0° C. with 1 C.

It was also found that as compared to the electrode A1 which includes non-treated hydrogen storage alloy powder, the electrode A2 which includes alkali-treated hydrogen storage alloy powder has a better discharge characteristic.

A cycle life test was performed as a charge/discharge test at the 10th and subsequent cycles. A charge/discharge cycle was repeated under the test conditions of a charge with a current of 0.5 C at 25° C. for 2.5 hours and a discharge with a current of 0.5 C to make a terminal voltage of 0.8 V. The cycle at which the electrode capacity dropped to 70% or less of the initial discharge capacity due to the cycle life test was assessed as the end of electrode life.

Figure 13:
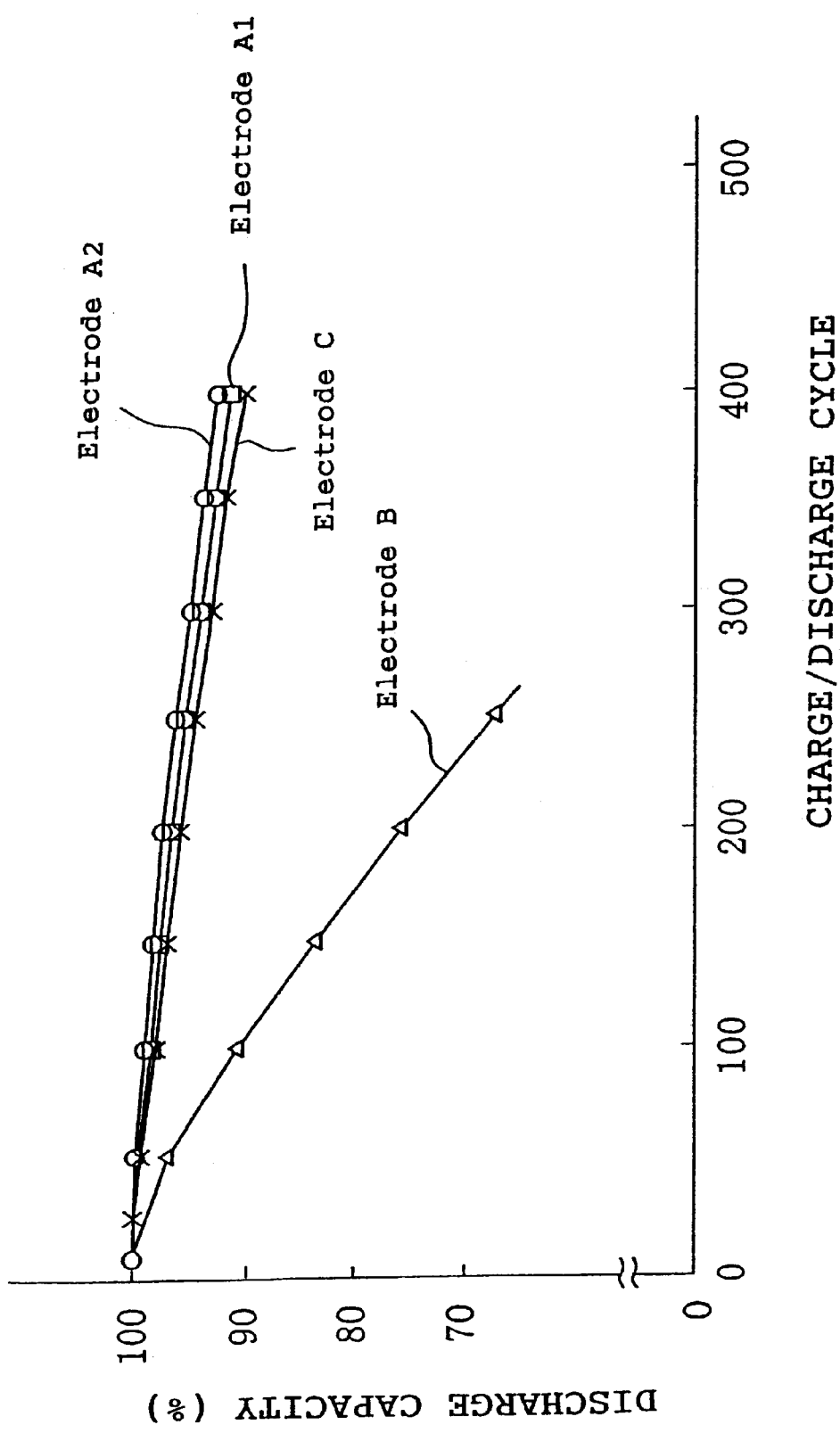
FIG. 13 is a graph illustrating the relationship between charge/discharge cycle and discharge capacity in electrodes A1, A2, B and C.

The results of cycle life test are shown in FIG. 13 which is a graph illustrating the relationship between charge/discharge cycle and discharge capacity. As shown in FIG. 13, despite no use of organic binder, electrodes A1 and A2 of the present invention achieved a cycle life characteristic without any problem as compared to the conventional electrode C including an organic binder. Electrode B of comparative example ended its electrode life at a relatively earlier stage.

Those test results confirmed that electrodes A1 and A2 of the present invention achieved a drastic improvement of aimed high rate discharge characteristic and would be very effective if assembled into a sealed battery without any problems in cycle life characteristic as concerned.

In the production method in accordance with the present invention, high performance electrode A can be obtained by a material mixing step, pressure molding step, (heating step) and cutting step. To the contrary, the conventional paste coating method can only offer an electrode with inferior performance to the electrode of the present invention by the material preparing step (including paste), coating and molding step, drying step, pressurizing step and cutting step.

Therefore, it can be understood that the production method of the present invention enables production of an electrode with much simpler steps than the conventional method. A particular and great difference of the production method of the present invention from the conventional method is treatment in a dry atmosphere. The production method of the present invention including the heating step will be explained in the following examples.

EXAMPLES 2 to 6

Next, various electrodes were produced by varying the electrode structure in a range of production method of the present invention on the basis of electrode A2 produced in Example 1. In Examples 2–6, the same hydrogen storage alloy powder as used in Example 1 was pretreated to modify the surface of the hydrogen storage alloy with the same element as the conductive material.

More specifically, a fine Ni powder having a particle size of 0.03 μm was mixed at 3 wt % of the hydrogen storage alloy powder and the resultant mixed powder was treated by mechanofusion in a gaseous argon atmosphere, using a mechanofusion device (Type AM-15F, manufactured by HOSOKAWA MICRON CORPORATION) (Example 2).

Separately, Ni was plated at 3 wt % onto the hydrogen storage alloy powder by using electroless Ni plating (Example 3).

These pretreatments gave hydrogen storage alloy powders whose surfaces are coated with Ni moderately. Using those pretreated hydrogen storage alloy powders, electrodes were produced following the procedure of Example 1 (electrode A2). The electrode obtained by using the mechanofusion-treated hydrogen storage alloy powder was named electrode "D" and the electrode obtained by using the Ni-plated hydrogen storage alloy powder was named electrode "E".

Figure 14:
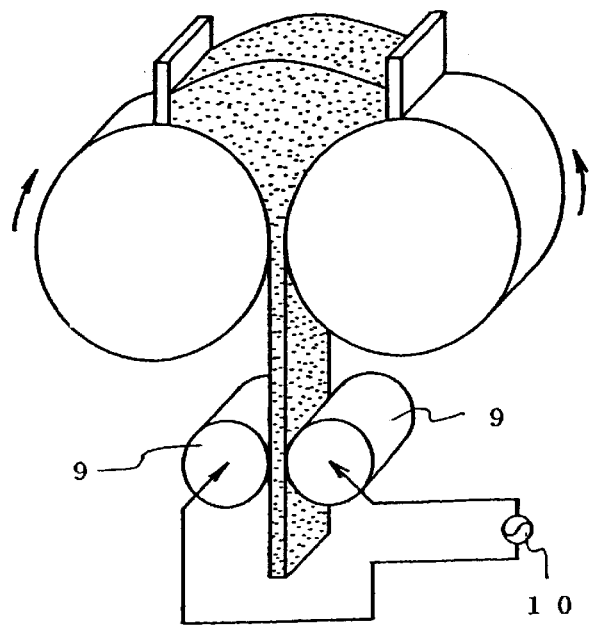
FIG. 14 is a schematic view of an apparatus used for producing the hydrogen storage alloy electrode in accordance with one example of the present invention.

Then, after producing a molded sheet in the same manner as in Example 1, the sheet was kept in a gaseous argon atmosphere. Subsequently, using the apparatus shown in FIG. 14, the sheet was subjected to resistance heating by means of a seam welding roller 9 using a seam welding power source 10 (Example 4). At that time, it was confirmed that the sheet was heated up to 950° C. at maximum by the resistance heating resulting from current supply between rollers 9. The sheet was heated for a very short time when it was in contact with the resistance heating rolls, followed by cooling in an environmental atmosphere in several seconds down to a temperature of 500° C. or less.

By the resistance heating, the sheet was baked in part and processed into a sheet with a stronger mechanical strength. The electrode thus obtained was named electrode "F".

Figure 15:
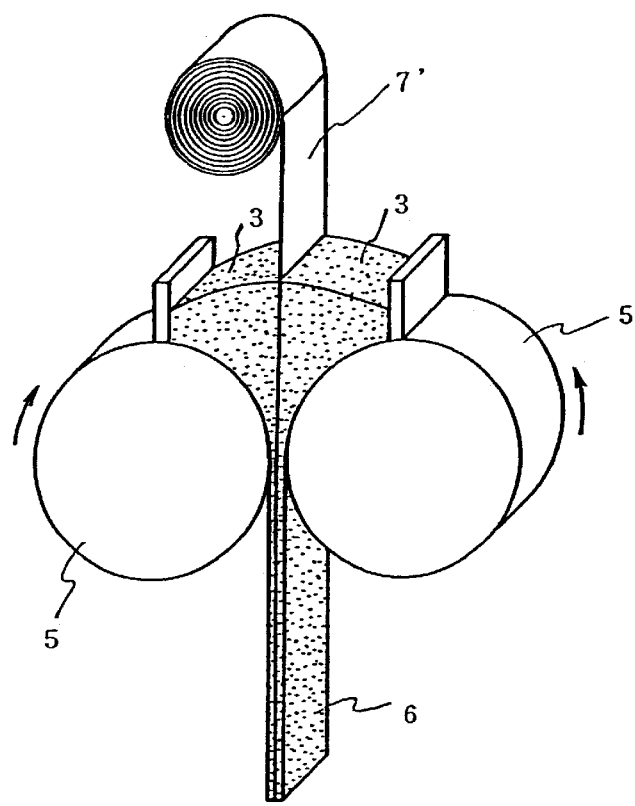
FIG. 15 is a schematic view of another apparatus used for producing the hydrogen storage alloy electrode in accordance with one example of the present invention.
Figure 16:
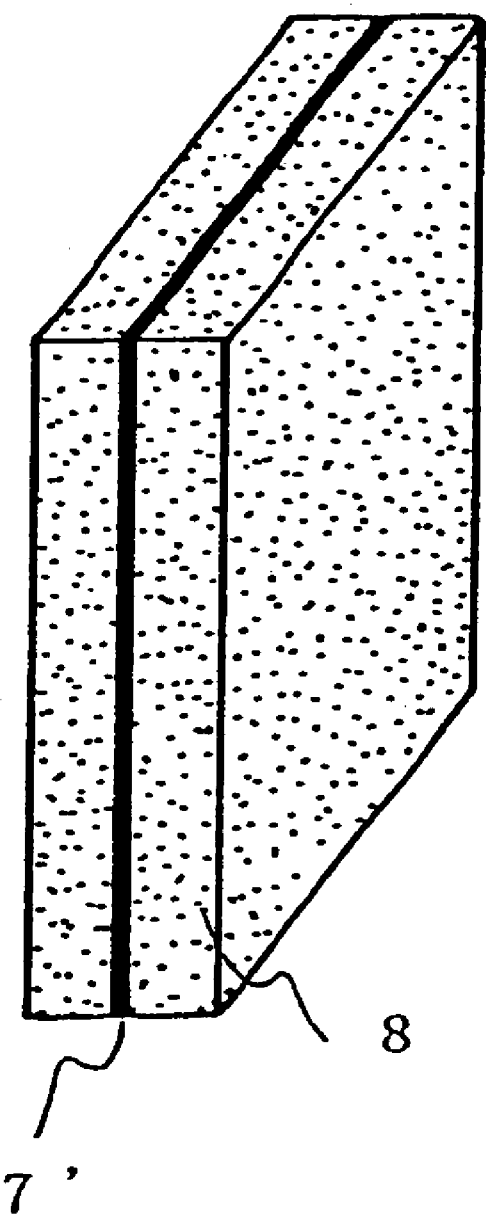
FIG. 16 is a schematic perspective view illustrating a hydrogen storage alloy electrode produced by the apparatus shown in FIG. 15 and used in one example of the present invention.

Next, using the apparatus shown in FIG. 15, an electrode "G" in which the active material holding layers 3 were placed on both sides of the conductive metal layer 7' (see FIG. 16) was produced in the same manner as in the case of the electrode "F" except that a porous embossed Ni core member 7' formed with projections and depressions on both surfaces was supplied into the center between a pair of rolls 5 in place of Ni powder as the material constituting the conductive metal layer and that the active material holding layers were formed on both sides of the conductive metal layer by supplying the active material (Example 5).

Separately, an electrode was produced in the same manner as in Example 1 except for the use of scaly Ni powder having a particle size of about 30 μm (manufactured by FUKUDA METAL FOIL & POWDER CO., LTD.) in place of Ni powder having a particle size of about 5 μm as the conductive metal powder (Example 6). The electrode obtained by this method was named electrode "H".

Electrodes D–H in accordance with the present invention were evaluated for their electrode performance using the above-mentioned test method. Of the evaluation results, those of high rate discharge characteristic are shown in Table 2.

TABLE 2

Results of discharge capacity test at each temperature and at each discharge rate in electrodes D–H

|  | 25° C. 0.2 C | 25° C. 1.0 C | 25° C. 3.0 C | 25° C. 5.0 C | 0° C. 1.0 C |
|---|---|---|---|---|---|
| Electrode D | 293 mAh/g 100% | 94% | 74% | 54% | 86% |
| Electrode E | 290 mAh/g 100% | 93% | 72% | 51% | 83% |
| Electrode F | 289 mAh/g 100% | 96% | 79% | 64% | 88% |
| Electrode G | 289 mAh/g 100% | 95% | 75% | 52% | 85% |
| Electrode H | 289 mAh/g 100% | 92% | 73% | 54% | 85% |
| Electrode A2 | 292 mAh/g 100% | 93% | 72% | 50% | 84% |

As evident from Table 2, all of the electrodes D–H of the present invention have a superior high rate discharge characteristic to electrode A2 of the present invention.

More specifically, improvements of pretreatment of the surface of hydrogen storage alloy to modify the surface of hydrogen storage alloy with the same element as the conductive material, short-term heat treatment at the stage of forming a sheet of the hydrogen storage alloy and Ni powder, the use of scaly Ni powder in place of Ni powder, and arrangement of a conductive core in the center of the electrode are effective. Of electrodes D–H, electrode F subjected to short-term heat treatment was particularly superior. Although not shown, the evaluation results of cycle life characteristics of electrodes D–H were equal to that of electrode A2.

EXAMPLES 7 to 18

In Examples 7–18, Ni and Cu were used as the conductive metal to examine their optical ratio to the hydrogen storage alloy.

First, the kind of used conductive material will be described. Two kinds of Ni were used: an Ni powder having a mean particle size of about 5 μm and a scaly Ni powder having a mean particle size of about 10 μm. Similarly, two kinds of Cu were used: a Cu powder having a mean particle size of 45 μm or less and a scaly Cu powder having a mean particle size of 10 μm or less. As the hydrogen storage alloy, the same $AB_2$ type alloy as that shown in Example 1 represented by the formula $MmNi_{3.6}Mn_{0.4}Al_{0.3}Co_{0.7}$ was used.

The four kinds of conductive metal powders were mixed with the hydrogen storage alloy powder to form 11 mixed powders by varying the ratio of the hydrogen storage alloy powder by 5 wt % in a range of 100 to 50 wt %. Then, 11 different electrodes were produced in the same manner as electrode A2 of Example 1.

The electrodes thus obtained were similarly assembled into open half cells and evaluated for their performance.

The evaluation results showed the following. As the key points in assessing characteristics of those hydrogen storage alloy electrodes, the following 3 points were taken into account particularly: 1) an electrode having a high capacity density; 2) an electrode with excellent high rate discharge characteristic; and 3) an electrode exhibiting an excellent cycle life characteristic.

The evaluation results showed that with increases of the ratio of conductive metal powder, the volume capacity density at low rate discharge of the electrode decreased. In order to secure a high capacity density, it is important to exclude the conductive metal powder. However, events observed in such electrodes with absent conductive metal powder were: severe impairment of the high rate discharge performance and extreme decrease of the cycle life characteristic.

Observation of those electrodes after evaluation revealed absence of the conductive metal powder, excess loss of the mechanical strength of the electrode plate due to repeated charge/discharge cycles, falling off of the alloy due to pulverization of the alloy, and a decrease of electrode conductivity. These events are estimated to have led to poor high rate discharge performance and poor cycle life characteristic.

It was therefore confirmed that if the ratio of the conductive metal power in the electrode is increased, the high rate discharge characteristic and cycle life characteristic would be improved almost continuously in correspondence with the ratio.

What performance is most important for the hydrogen storage alloy electrode for use in nickel-metal hydride storage battery, high capacity density, high rate discharge characteristic or cycle life characteristic, may slightly vary depending on the use condition of the battery. However, in order to satisfy all of the above-mentioned important characteristics, it is preferable to form the active material holding layer essentially composed of the hydrogen storage alloy and conductive metal in a ratio of 95 to 70 wt % hydrogen storage alloy powder and 5 to 30 wt % conductive metal powder.

It was found that ratios of the hydrogen storage alloy exceeding 95% pose problems of poor high rate discharge performance and poor cycle life characteristic and that ratios of the hydrogen storage alloy lower than 50 wt % pose a problem of failing to offer a battery of high capacity due to a decrease of capacity density.

With respect to the difference between Ni and Cu as conductive metal powders, there was no significant difference in performance in the evaluation and the two elements were found effective as a conductive metal. Observed minor differences may be due to the difference in powder shape. A tendency was observed that scaly powders exhibited superior high rate discharge and cycle life characteristics to normal particulate powders with relatively small amounts.

EXAMPLES 19, 20 AND COMPARATIVE EXAMPLE 3

Next, practical sealed batteries were produced using the hydrogen storage alloy electrodes of the present invention.

Sealed batteries were produced using electrode A2 obtained in Example 1, electrode C obtained in Comparative Example 2 and electrode F obtained in Example 4 and were compared for their characteristics.

The positive electrode was produced in the following manner. A paste type nickel positive electrode called SME was produced by filling a paste of a mixture of a known particulate nickel hydroxide powder with cobalt hydroxide and zinc oxide into a porous nickel sponge having a network structure, followed by drying and pressing it. As the separator, a known non-woven polypropylene fabric whose surface is imparted with hydrophilicity was used. As the negative electrode, electrodes A2, C or F was used.

In order to enhance current collecting capacity as batteries, the electrodes A2, C and F were modified to allow direct resistance welding between the conductive metal layer and an electrode terminal by providing a portion whose one end is composed only of the conductive metal layer in the direction of electrode width.

As sealed batteries, the so-called SC size batteries having a diameter of 23 mm and a height of 43 mm were produced. An electric power generating element prepared by spirally winding three layers of the positive electrode, separator and negative electrode was housed in a battery casing. For taking out the lead, the so-called ??tabless?? current collecting structure used in usual high rate discharge was adopted. Subsequently, an electrolyte dissolving 30 g/l lithium hydroxide in potassium hydroxide having a specific gravity of 1.30 was injected into the battery casing and a metal jacket can and a sealing cap which is a lid with a safety valve were sealed with routine squeeze sealing technique which gave a sealed nickel-metal hydride storage battery. The battery is regulated for the capacity by the positive electrode to 3 Ah. 3 A is equal to 1 C.

Next, SC size sealed nickel-metal hydride storage batteries including electrode A2, C or F were produced each 5 pieces and received 5 cycles of full charge and discharge with a relatively low current. In other words, a cycle of a charge at 25° C. for 6 hours with 0.2 C and a discharge with 0.2 C until the voltage dropped to 1.0 V was repeated. Charge and discharge at initial cycles confirmed that the batteries had performance as expected initially.

Subsequently, the batteries underwent a high rate discharge test at 25° C. with a current of 3.3 C and 10 C. The test condition included repeated cycles of a charge at 25° C. for 1.2 hours with 1 C and a discharge with a current of 10 A and 30 A until the terminal voltage dropped to 1.0 V.

Table 3 lists mean values of the intermediate discharge voltage and discharge capacity ratio of the batteries including electrode A2, C or F. The discharge capacities at high rate discharge with 10 A and 30 A are expressed as capacity ratios (%) by defining the discharge capacity at 25° C. with 0.2 C as 100%.

TABLE 3

Results of high rate discharge test in sealed batteries using electrodes A2, C and F

| | Discharge at 10 A | | Discharge at 30 A | |
|---|---|---|---|---|
| | Intermediate voltage | Capacity ratio | Intermediate voltage | Capacity ratio |
| Electrode A2 | 1.18 V | 98% | 1.11 V | 93% |
| Electrode C | 1.16 V | 97% | 1.08 V | 90% |
| Electrode F | 1.20 V | 99% | 1.15 V | 97% |

From the above, it was clearly shown that the batteries using electrodes A2 and F in accordance with the present invention have markedly superior high rate discharge performance to the battery using the conventional electrode C of comparative example.

Then, sealed batteries including electrode A2, C or F underwent the cycle life test. The test condition included repeated cycles of a charge at 25° C. for 1.2 hours with 1 C and a discharge with a current of 1 C until the terminal voltage dropped to 1.0 V. The cycle when the electrode capacity dropped to 70% or less of the initial discharge capacity by the cycle test was assessed as the end of life of the battery.

Figure 17:
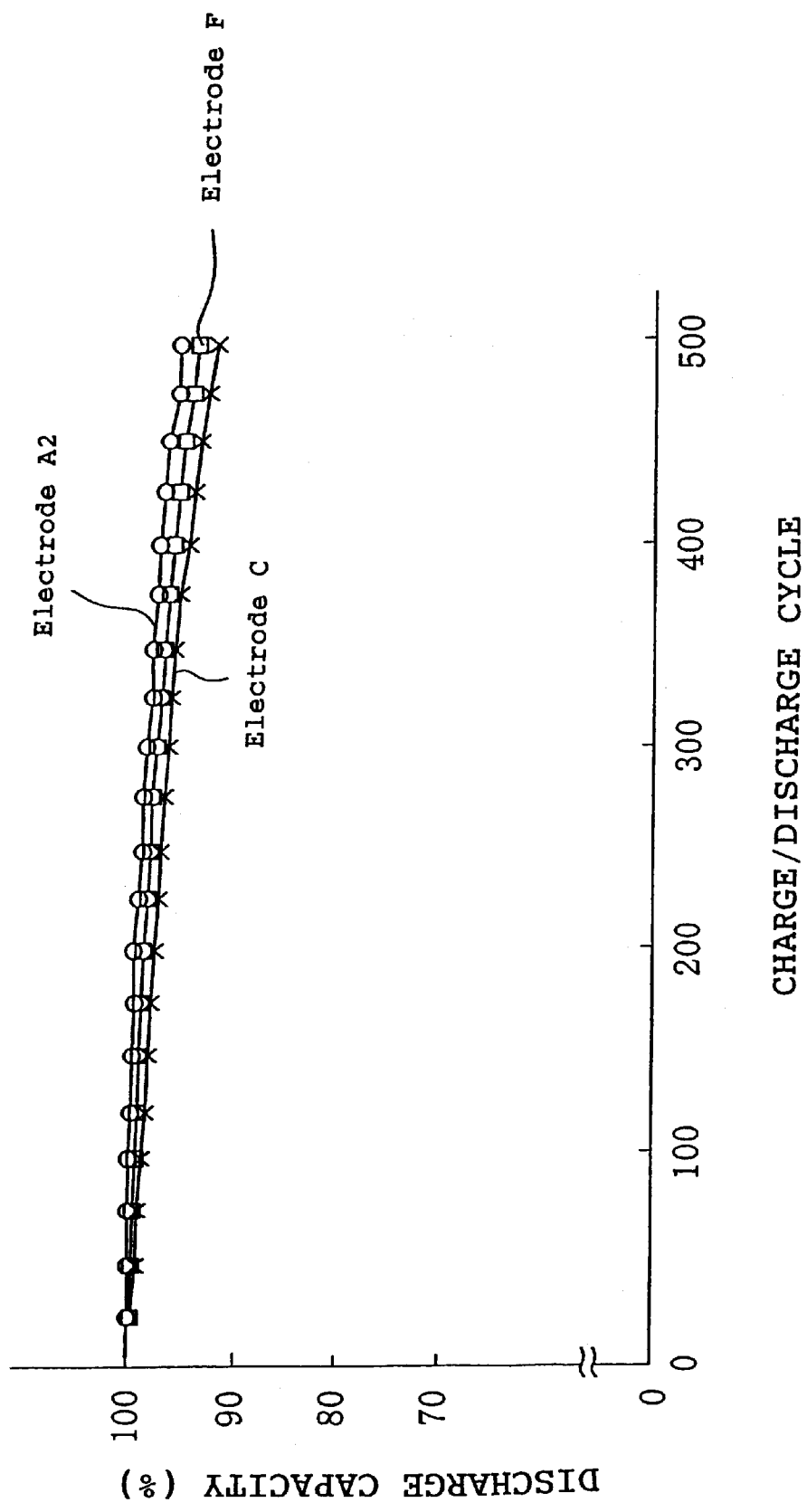
FIG. 17 is a graph illustrating the relationship between charge/discharge cycle and discharge capacity in sealed storage batteries including electrode A2, C or F.

The test results are shown in FIG. 17. As clearly seen from the figure, despite no use of organic binder, electrode A enabled cycle life characteristics with no problem as compared with the conventional electrode C with organic binder. The test results confirmed that electrodes A2 and F in accordance with the present invention can improve drastically the intended high rate discharge characteristic, and are much useful when assembled into sealed batteries with no problems in cycle life characteristic which was a matter of concern.

A combination of various electrode constituting techniques as embodied in the foregoing examples enables further development of the effect of the present invention. For example, a synergistic effect can be expected from a combination of electrode F with electrode H.

As stated before, the present invention is not limited only to the foregoing examples and encompasses the range stated in the Disclosure of Invention and the range of modifications and alterations made by the ordinary skilled ones as appropriate.

INDUSTRIAL APPLICABILITY

According to the present invention, it is possible to produce a hydrogen storage alloy electrode particularly excellent in high rate charge/discharge characteristics and facilitating recycling while satisfying performance of general requirement with a simple and relatively cost effective method. The present invention can also provide an epoch-making hydrogen storage alloy electrode by eliminating, because of no use of organic binder, removal of organic compounds contained in the electrode which had long been problems at recovering and recycling the hydrogen storage alloy electrode.

The hydrogen storage alloy electrode, method for producing the same and the battery using the electrode can be widely applied to the battery field.

We claim:

1. A hydrogen storage alloy electrode comprising a hydrogen storage alloy and a conductive metal and no organic binder, wherein said hydrogen storage alloy electrode comprises at least two layers including at least one layer each of:

an active material holding layer essentially composed of a hydrogen storage alloy powder and a conductive metal powder; and a conductive metal layer essentially composed of said conductive metal powder or a conductive metal porous material, said active material holding layer and said conductive metal layer being integrated to form said electrode having a conductive network communicating throughout said electrode, wherein the electrode has major surfaces parallel to said layers and a thickness transverse to said layers, and wherein a center of the electrode in a thickness direction is composed of said conductive metal layer and the major surfaces of the electrode are composed of said active material layers.

2. The hydrogen storage alloy electrode in accordance with claim 1, wherein the conductive metal of said active material holding layer and said conductive metal layer comprises Ni or Cu or an alloy containing Ni and Cu, said active material holding layer comprises 70 to 95 wt % hydrogen storage alloy powders and 30 to 5 wt % conductive metal powders, and said conductive metal layer comprises 95 wt % or more conductive metal.

3. The hydrogen storage alloy electrode in accordance with claim 1, wherein said conductive metal layer and said active material holding layer have a continuous composition gradient throughout the thickness of the electrode.

4. The hydrogen storage alloy electrode in accordance with claim 1, wherein at least one of said major surfaces of the electrode is plated with a said conductive metal layer.

5. The hydrogen storage alloy electrode in accordance with claim 1, wherein at least a portion of said conductive metal layer is composed of a two-dimensional or three-dimensional conductive metal porous material.

6. The hydrogen storage alloy electrode in accordance with claim 5, wherein said two-dimensional or three-dimensional conductive metal porous material is an embossed plate, punched metal sheet, expanded metal sheet, metal sponge sheet, lath metal sheet or metal fiber cloth.

7. The hydrogen storage alloy electrode in accordance with claim 1, wherein said electrode has a thickness of 0.5 mm or less and a porosity of 5 to 20%.

8. The hydrogen storage alloy electrode in accordance with claim 1, wherein said hydrogen storage alloy powder has a nickel-rich surface and is pretreated with hot alkali or acid.

9. The hydrogen storage alloy electrode in accordance with claim 1, wherein said hydrogen storage alloy powder has a surface having a metallic nickel layer and is subjected to mechanofusion or plating beforehand.

10. A method for producing a hydrogen storage alloy electrode comprising a hydrogen storage alloy and a conductive metal and no organic binder, comprising the steps of:

(a) supplying a hydrogen storage alloy powder, a conductive metal powder and/or a conductive metal porous material;

(b) laminating at least one layer each of (i) an active material holding layer comprising a mixture of said hydrogen storage alloy powder and said conductive metal powder and (ii) a conductive metal layer essentially composed of said conductive metal powder or said conductive metal porous material, and (c) pressing a laminate produced by step (b) to integrate said active material holding layer and said conductive metal layer to make a sheet and to produce a conductive network communicating throughout said electrodes wherein said step (b) and said step (c) are performed with a roll-press method using a pair of rolls whose surface has an uneven part.

11. The method for producing a hydrogen storage alloy electrode in accordance with claim 10, wherein said step (b) and said step (c) are performed concurrently.

12. The method for producing a hydrogen storage alloy electrode in accordance with claim 10, wherein said mixture is heated in a non-oxidative atmosphere for 10 minutes or less in a temperature range of not less than 500° C. and not more than the lowest melting point of the melting points of the metal elements constituting said electrode during or after said step (c).

13. The method for producing a hydrogen storage alloy electrode in accordance with claim 12, wherein the heating is performed by induction heating, excitation heating, hot-press heating, light beam heating or heat ray irradiation heating.

* * * * *